United States Patent Office 3,833,524
Patented Sept. 3, 1974

3,833,524
LATEX FOAMS
Benjamin F. Ward, Charleston, S.C., assignor to
Westvaco Corporation, New York, N.Y.
No Drawing. Continuation-in-part of abandoned application Ser. No. 160,171, July 6, 1971. This application Nov. 20, 1972, Ser. No. 307,927
Int. Cl. C08d 9/00, 13/08
U.S. Cl. 260—2.5 L          9 Claims

ABSTRACT OF THE DISCLOSURE

Polycarboxylic acids and fatty acid-polycarboxylic acid mixtures are effective ingredients for foam latex. When a polycarboxylic acid having from 15 to 26 carbon atoms, at least one carboxyl group near the center of the hydrocarbon chain and at least one on the termial carbon, is used as an ingredient in foam latex, there is imparted to the latex faster bubble rates, good foam stability, independence from pH control, and variable foam density. It is preferable that the post stabilizers contain from 1 to 98% by weight polycarboxylic acid with the remainder being oleic acid or a fatty acid mixture having a substantial oleic acid fraction.

CROSS REFERENCE TO RELATED APPLICATION

This application is a continuation-in-part of copending U.S. application Ser. No. 160,171, filed July 6, 1971, and now abandoned.

BACKGROUND OF THE INVENTION

This invention relates to rubber compositions, both natural and synthetic rubber, and more particularly to latex foams produced therefrom. Also, this invention relates to a method for modifying latex foaming characteristics.

Fatty acids, especially oleic acid, are used as emulsifiers and stabilizers in the production of foam rubber to provide a resilient and light weight product. Utilization of oleic acid in latex compositions is taught, for instance, in U.S. Pat. 2,706,183 to Carter. In the compounding of rubber for foam, a fatty acid, such as oleic acid, is added to the latex mix. Among other things, the fatty acid acts as a surfactant to increase the foaming characteristics. However, formulations stabilized with oleic acid soaps must be frothed within narrow pH ranges. It is desirable that they be used above pH 11.2. The pH range is high because the frothing rate of the compounded latex changes with pH in the commercial formulations currently used. Other fatty acids useful in rubber emulsion polymerization systems include dimer acids of linoleic acid, such as are disclosed in U.S. Pat. 2,876,203 to Miller et al.

Commercially, latex is frothed continuously in a disc shaped machine containing a rapidly turning rotor positioned between two stationary stators machined or attached inside the disc housing. A typical example is the Oakes Continuous Mixer. In such a mixer, the correct proportions of compounded latex and compressed air are introduced into the mixing head to produce the desired density in the finished foam. During the time the mixture is passing through the machine, the air is blended into the latex in the form of tiny bubbles. If the latex froths too slowly, there will be insufficient time during passage through the mixer for all of the air to blend in. The froth thus produced will be of excessive density and will issue from the outlet hose in bursts interspersed with pockets of the unblended air instead of in the desired continuous smooth flowing homogeneous fluid.

It has been found that when a post stabilizer containing at least some polycarboxylic acid is used, the pH range where proper frothing is obtained is broadened.

It is therefore a general object of this invention to produce latex foams having a $C_{15}$ to $C_{26}$ polycarboxylic acid as an ingredient. Another object of this invention is to produce stable foams from various latexes, such as, for example, sytrene-butadiene, polybutadiene, nitrile polyisoprene and neoprene. It is a further object of this invention to produce latex foams incorporating an ingreident which gives fast bubble formation and less dense foams. Another object of this invention is to provide an ingredient which eliminates undesirable decrease in frothing rate with change in pH. An even further object of this invention is to produce latex foams incorporating a $C_{21}$-dicarboxylic acid as a post stabilizer. Still another object of this invention is to provide an ingredient for latex foams having the advantages of both oleic acid and $C_{15}$ to $C_{26}$ polycarboxylic acids.

Other objects, features and advantages will be evident from the following disclosure.

SUMMARY OF THE INVENTION

It has been found that when polycarboxylic acid soaps having from 15 to 26 carbon atoms, at least one carboxyl group near the center of the hydrocarbon chain, and at least one carboxyl group on the terminal carbon, is used as an ingredient in compounded latex, the foams are produced more rapidly, are less dense and the frothing rate of the latex does not decrease with variations in pH. The polycarboxylic acid soap is used from about 0.075 parts to about 10 parts per 100 parts of latex. One preferred polycarboxylic fatty acid for use in this invention is a $C_{21}$-dicarboxylic acid. Furthermore, better results are obtained when using the polycarboxylic acids in a 1 to 98% mixture with oleic acid; than when using oleic acid alone.

DETAILED DESCRIPTION OF THE INVENTION

The frothing of compounded latexes of both synethic and natural rubber containing soaps or free acids of various post stabilizers showed that use of the polycarboxylic acids of this invention give compounded latex unique properties. By simply observing the frothing of the latex it is obvious that with a polycarboxylic acid present much more foam from a given amount of latex is obtained. Furthermore, the foam forms much more rapidly. For example, under given conditions, latex containing oleic acid is frothed to maximum foam in about 85 seconds and has a density of 130 grams per liter; whereas, under identical conditions latex containing a $C_{21}$-discarboxylic acid is frothed to maximum foam in about 10–15 seconds and has a density of 83 grams per liter. In contrast, both frothing rate and foam density are negatively influenced by dimer fatty acids containing 36 carbon atoms or short chained dicarboxylic acids, such as azelaic acid which has 9 carbon atoms.

The polycarboxylic acids contemplated for use in the latex formulations of this invention include dicarboxylic acids having 15 to 26 carbon atoms and have one carboxyl group near the middle of the hydrocarbon chain and the other at a terminal carbon.

The preferred polycarboxylic acids contemplated for use in this invention are $C_{21}$-dicarboxylic acids having the following structure:

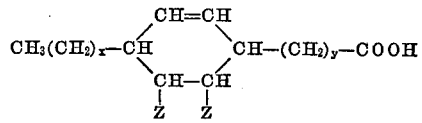

wherein $x$ and $y$ are integers from 3 to 9, $x$ and $y$ together equal 12, and where Z is a member of the group consisting of hydrogen and COOH with one Z of each moiety.

Examples of polycarboxylic acids having more than two carboxyl groups include, for example, $C_{22}$ tricarboxylic acid and $C_{26}$ pentacarboxylic acid. As used herein the terms "polycarboxylic acid" and "dicarboxylic acid" are intended to include those acids having 15 to 26 carbon atoms, at least one carboxyl group near the middle of the hydrocarbon chain, and at least one carboxyl group at a terminal carbon. The polycarboxylic acids are added to the latex mixture as a soap, such as the alkali metal soap, or in the free acid form. The cured latex foam may contain the polycarboxylic acid in the soap form or the free acid form or a mixture.

The amount of polycarboxylic acid added as a post stabilizer depends to a certain extent on the particular latex system being used, e.g., SBR, polybutadiene or other system. However, an amount of polycarboxylic is added to at least show the effect of good foam stability up to about 10 parts per 100 parts of latex. The minimum amount of stabilizer to show an effective result is about 0.075 parts per 100 parts latex on a dry basis. The preferred amount when using the polycarboxylic acids without mixing other fatty acids is about 2–4 parts per 100 parts of latex.

Latex foams much more rapidly than normal when polycarboxylic acids are substituted for all of or a portion of the oleic acid. Also, a greater volume of foam with lower foam density results when polycarboxylic acids are used. Either or both of these effects are advantageous to compounders of latex for foam rubber. The foam structure and general appearance of compounded latexes seems to be comparable with either $C_{19}$ or $C_{21}$-dicarboxylic acid post stabilizer or with mixtures containing the two. Furthermore, mixtures of tall oil fatty acids rich in oleic acid and polycarboxylic acids have all the advantages of pure polycarboxylic acid and pure oleic acid.

Pure polycarboxylic acid was not essential for promotion of frothing rate and foam density, but fatty acid mixtures rich in oleic acid containing only about 40% polycarboxylic acid froth in about 25 seconds and give a foam density of 90 grams per liter. In fact, as little as 1% polycarboxylic acid in a fatty acid mixture gives an improvement in froth rate. Thus a variety of post stabilizers easily produced, providing for a range of polycarboxylic acid content. For polycarboxylic acids to be used as ingredients in foam rubber, it is important that the foam produced be a least as stable as that currently produced. It should be understood, of course, that the polycarboxylic acid is added to the compounded latex in a water-soluble form. Therefore, the form in which the polycarboxylic acid is added, soap or free acid, is determined by the pH of the latex system.

With oleic acid post stabilizers, the pH is critical in getting proper frothing and resultant foam structure. If an oleic acid is used as the post stabilizer there are three levels of slow frothing encountered above the gelation point. The slow frothing occurs in the following pH regions: 11.0, 10.5 and 9.5. It has been shown in a formulation requiring about 2.5 parts post stabilizer, that if the post stabilizer is 95% disproportionated tall oil fatty acids and 5% $C_{21}$-dicarboxylic acid there is slow frothing only around pH's 10.5 and 9.5. If the post stabilizer is 75% disproprtionated tall oil fatty acids and 25% dicarboxylic acid there is slow frothing only at 9.5. If the post stabilizer has 38% or more dicarboxylic acid then there is no region of sluggish frothing. It therefore seems that by using a fatty acid/dicarboxylic acid blend as a post stabilizer, latex may be compounded at any desired pH and at the same time get rapid, uniform frothing. Of course, these percentages will vary with different compounded latexes since the total dicarboxylic acid present varies with the amount of ingredients present.

The post stabilizers of this invention are useful in latex formulation that heretofore have used conventional fatty acids, such as oleic acid, as the post stabilizer. Examples of such latex formulation include those of copolymers of styrene-butadiene (SBR), polybutadiene, nitrile, such as butadiene/acrylonitrile, poly-isoprene and neoprene.

The following formulation is typical of a cold SBR latex formulation used in the examples of this invention, but is not to be construed as a limitation thereof.

GENERAL LATEX COMPOUNDED FORMULATION

| Component: | Parts by Weight (Dry) |
|---|---|
| Synthetic Latex: | 70 |
|   Butadiene, 70%. | |
|   Styrene, 30%. | |
| Antioxidant | 1.0 |
| Post stabilizer soap | 2.5 |
| Potassium hydroxide (9.6 gm. in 24.2 gm. water) | 0.6 |
| Tamol 731 | 0.2 |
| Clay | 30.0 |
| Feldspar | 70.0 |
| Alumina | 40.0 |
| Natural latex | 30.0 |
| Silicone | 0.2 |
| Ammonium hydroxide (28%) (2 ml.). | |
| Thickener | 0.1 |
| Cure paste | 7.4 |
| Trimene base | 0.5 |

After complete mixing, the formulation is greater than 70% solids. The compounded latex is frothed and the foam density measured immediately. The foam is then transferred to a mold, heated for 10 seconds at 193° C. and then cured for 45 minutes in an oven at 93° C.

The practice of this invention may clearly be seen in the following examples.

Example 1

To illustrate that polycarboxylic acids are useful in post stabilizers for latex in the foam rubber industry, various post stabilizer as potassium soaps were added to an uncompounded latex of 70:30 butadiene:styrene. Measurements of foam density and rate of foaming were compared. The post stabilizers (28.2 g. of the potassium soap at 18.5% solids of various fatty acids) were blended into 300 grams of latex (70% solids). This mixture was frothed using a 10 speed Kitchen-Aid mixer. The frothing cycle was: speed 10 for 90 seconds, speed 4 for 60 seconds and speed 1 for 120 seconds. After the cycle was complete, a given volume of foam was weighed to determine its density. Also, the time required for the foam level to reach its maximum height was taken. The results are shown in Table I.

TABLE I

The effect of post stabilizer on the foam densities and foaming rates of latex at pH 10.5

| Post stabilizer | Foam density (grams/liter) | Foam rate (seconds to max. foam) |
|---|---|---|
| Commercial animal derived oleic acid [1] | 131 | 85 |
| Commercial modified tall oil fatty acids [2] | 110 | 80 |
| Commercial grade of $C_9$ azelaic acid [3] | 163 | 90 |
| Commercial $C_{36}$ dimer acid [4] | 165 | 90 |
| Crude $C_{21}$ dicarboxylic acid [5] | 91 | 25 |
| $C_{21}$ dicarboxylic acid [6] | 83 | 10 |
| Commercial $C_{19}$ dicarboxylic acid [7] | 84 | 20 |
| $C_{22}$ tricarboxylic acid [8] | 84 | 20 |
| $C_{22}$, $C_{23}$ tri and pentacarboxylic acids [9] | 86 | 15 |

[1] Emersol 233-LL from Emery Industries.
[2] Westvaco 1480 fatty acids from Westvaco Corporation.
[3] Emerox 1144 from Emery Industries.
[4] Emery 1024 from Emery Industries.
[5] 40% by weight dicarboxylic acid; 60% Westvaco 1480 fatty acids.
[6] 90% pure $C_{21}$-dicarboxylic acid (5% fatty acids; 5% dimer acids).
[7] Heptadecane dicarboxylic acid SL-27 from B.A.S.F. Corporation.
[8] 65% by weight tricarboxylic acid, 35% fatty acids.
[9] 80% polycarboxylic acids; 20% tall oil fatty acids.

As is evident, the latex formulations containing dicarboxylic acid and polycarboxylic acid post stabilizers foam much more rapidly than do those containing oleic acid-type soaps. Also, it is interesting to note that both the $C_{19}$ and $C_{21}$-dicarboxylic acids enhance the foaming rate and lower foam density; whereas, the $C_{36}$ dimer acid and the small dicarboxylic acid, azelaic acid, seem to be poor foaming agents and thus gave very dense foam.

Example 2

As stated earlier, mixtures of dicarboxylic acid and oleic acid are effective ingredients for latex foams. This example illustrates the effect of various levels of $C_{21}$-dicarboxylic acid in an oleic acid/dicarboxylic acid mixture. The potassium soaps of an animal derived oleic acid and $C_{21}$-dicarboxylic acid were blended at various levels. The blends were then added at 2.5 parts per 100 parts rubber in the general latex compounded formulation. The formulations were foamed as described in Example 1.

TABLE II

Effect of various ratios of oleic to $C_{21}$-dicarboxylic acid in the post stabilizer on the foam density of latex

| Post stabilizer composition | | Characteristics of foam | |
|---|---|---|---|
| Percent oleic | Percent pure diacid | Density, g./l. | Time to maximum foam, sec. |
| 100 | 0 | 123 | 80 |
| 95 | 5 | 103 | 60 |
| 90 | 10 | 94 | 30 |
| 80 | 20 | 92 | 30 |
| 60 | 40 | 88 | 20 |
| 0 | 100 | 83 | 10 |

The results indicate that once a ratio of 95% to 5% oleic acid to dicarboxylic acid is reached, the effects of the dicarboxylic acid are very much in evidence. Only gradual decreases in foam density occur as the percentage of dicarboxylic acid is increased above 10% dicarboxylic acid and the optimum range appears to be at about 40% dicarboxylic acid in the mixtures.

Example 3

For polycarboxylic acids to be useful as ingredients in the frothing of latex, the resulting foam must have good stable structure. A check of stability was made by actually compounding latex foams for rug backing using various post stabilizers in the general formulation. Each latex sample was frothed to give foam densities of about 210–220 grams per liter no matter which post stabilizer was used. The foam was spread on a mold, and the layer of foam gelled. At equal foam density of the latexes, those containing $C_{21}$-dicarboxylic acid formed rubber pads equivalent to those containing oleic acid. The major difference was that when $C_{21}$-dicarboxylic acid is present, the pH of the compounded latex had no effect on the quality of the foam pad prepared. Samples using animal derived oleic acid, modified tall oil fatty acid, and crude $C_{21}$-dicarboxylic acid all gave foam pads comparable in appearance, foam structure and feel.

Example 4

Oleic acid-type soaps interact with various components used in formulating latex for foam applications to produce slower generation of froth over certain ranges of pH. It is therefore necessary to compound latex at pH's which avoid the slow frothing regions. Generally, this is accomplished by compounding so that the pH during frothing will be above 11.25, the upper limit of the highest pH region exhibiting decreased froth rate. If a latex compound froths faster than the minimum rate required to incorporate all of the air during the required time, some advantages in fine foam structure is often achieved through refining to smaller bubbles during this excess mixing time.

To illustrate the improved frothing characteristics of this invention, dicarboxylic acids were compared to oleic acids. The results showed that polycarboxylic acids eliminate the slow frothing pH regions above pH 9.5 which is at or near the pH of gelation. In addition, frothing rate was faster than that obtained with either animal or tall oil derived oleic-type post stabilizer.

A gas chromatograph can be used as an instrument to study frothing characteristics. This instrument establishes the ease with which bubbles can be formed from an 18 gauge vertical syringe needle whose point is touching the bottom of a 50 milliliter beaker containing 25 grams of latex compound. The syringe needle is attached with tubing to the carrier gas exit from the chromatograph. The gas chromatograph is designed to always maintain a constant volume of helium flowing through the instrument and needle. However, in building a bubble to the critical size where it breaks loose from the needle, pressure is developed in the system. When the bubble breaks loose, this pressure is suddenly released. An instant is required for the flow control valve to overcome this rapid pressure change during which time excess helium flows in the system. The imbalance in gas flow volume occurring during this instant is transferred to the recorder appearing as a sharp peak on the chart paper. The greater the pressure change, the greater height the peak will cover on the chart. The bubble rate is determined from the number of peaks produced per minute. In Table III, bubble rate and peak height are compared for four compounds prepared according to the general latex compounded formulation. The pH's were adjusted to the desired region with $CO_2$ gas. The general latex compounded formulation used in these studies is that outlined above.

TABLE III

Effect of pH on foam rate with various soaps

| | Animal derived oleic acid | Tall oil derived oleic acid | $C_{21}$-dicarboxylic acid (40%)/oleic acid (60%) | $C_{21}$-dicarboxylic acid (90%) |
|---|---|---|---|---|
| pH | 11.65 | 11.61 | 11.32 | 11.77 |
| Bubbles/minute | 114 | 132 | 131 | 159 |
| Peak height (inches) | 1.7 | 1.9 | 1.5 | 1.3 |
| pH | 11.45 | 11.31 | 11.12 | 11.48 |
| Bubbles/minute | 113 | 121 | 167 | 149 |
| Peak height (inches) | 1.6 | 1.7 | 1.3 | 1.7 |
| pH | 11.10 | 11.12 | 10.85 | 11.38 |
| Bubbles/minute | 101 | 101 | 160 | 168 |
| Peak height (inches) | 1.8 | 1.8 | 1.4 | 1.3 |
| pH | 11.02 | 10.80 | 10.57 | 10.80 |
| Bubbles/minute | 96 | 127 | 164 | 173 |
| Peak height (inches) | 1.9 | 1.7 | 1.3 | 1.3 |
| pH | 10.40 | 10.50 | 10.15 | 10.65 |
| Bubbles/minute | 63 | 79 | 163 | 172 |
| Peak height (inches) | 1.8 | 1.7 | 1.3 | 1.3 |
| pH | | 10.30 | 9.95 | 10.45 |
| Bubbles/minute | | 98 | 142 | 174 |
| Peak height (inches) | | 1.7 | 1.3 | 1.3 |
| pH | | 10.28 | 9.63 | 10.40 |
| Bubbles/minute | | 104 | 175 | 208 |
| Peak height (inches) | | 2.2 | 1.3 | 1.4 |
| pH | | 10.02 | | 10.12 |
| Bubbles/minute | | 89 | | 180 |
| Peak height (inches) | | 2.1 | | 1.3 |
| pH | | 9.80 | | 9.85 |
| Bubbles/minute | | 80 | | 203 |
| Peak height (inches) | | 1.9 | | 1.1 |
| pH | | 9.51 | | 9.68 |
| Bubbles/minute | | 50 | | 202 |
| Peak height (inches) | | 2.1 | | 1.2 |
| pH | | | | 9.60 |
| Bubbles/minute | | | | 201 |
| Peak height (inches) | | | | 1.2 |

It is apparent from Table III that a decrease in bubble rate occurs in the vicinity of pH 11 with another decrease in the vicinity of pH 10.5 when oleic acids of either animal or tall oil origin were used. A third rate decrease is seen at pH 9.51 with tall oil oleic acid. No pH regions of appreciable bubble rate decrease are seen with either crude or pure $C_{21}$-dicarboxylic acid. In fact, bubble rates are greater with the dicarboxylic acid soaps than with oleic-type soaps at almost every pH. Instead of the normal decrease in rate with decreasing pH obtained with oleic type soaps, dicarboxylic acid produced equal or somewhat greater bubble rates as the pH is decreased through the regions of interest. The fastest rates were obtained with the purest dicarboxylic acid decreasing somewhat when oleic type acids were present.

Example 5

This example illustrates the minimum amount of dicarboxylic acid necessary to overcome the rate decrease at the upper (11.0) pH region. The potassium soap of the $C_{21}$-dicarboxylic acid of the formula shown above was added to the SBR formulation set forth herein at 0.075 parts soap per 100 parts latex and 0.125 parts soap per 100 parts latex. The results showed that the rate decrease is slowed at the 0.075 parts level and absent at the 0.125 parts level.

While the invention has been described and illustrated herein by references to various specific materials, procedures and examples, it is understood that the invention is not restricted to the particular materials, combinations of materials, and procedures selected for that purpose. Numerous variations of such details can be employed as will be appreciated by those skilled in the art.

What is claimed is:

1. Latex foams containing from about 0.075 to about 10 parts per 100 parts of latex of an ingredient from the group consisting of dicarboxylic acids having from 15 to 26 carbon atoms, at least one carboxylic group near the middle of the hydrocarbon chain and at least one carboxyl group on a terminal carbon and mixtures thereof, said latex being a member of the group consisting essentially of copolymers of styrene-butadiene, polybutadiene, poly-isoprene, and neoprene.

2. The latex foam of claim 1 wherein said dicarboxylic acid is in its soap form.

3. The latex foams of claim 1 wherein said dicarboxylic acid is from the group consisting of dicarboxylic acids having 19 and 21 carbon atoms and mixtures thereof.

4. Latex foams from the group consisting of copolymers of styrene-butadiene, polybutadiene, poly-isoprene, and neoprene containing between about 0.075 parts and not more than 10 parts per 100 parts of latex of a post stabilizer, said post stabilizer consisting of 2% to 99% of a fatty acid mixture having a major portion of oleic acid and 1% to 98% by weight of a dicarboxylic acid from the group consisting of dicarboxylic acids having 15 to 26 carbon atoms, at least one carboxyl group near the middle of the hydrocarbon chain, and at least one carboxyl group on a terminal carbon and mixtures thereof.

5. The latex foams of claim 4 wherein said fatty acid mixture is a tall oil fatty acid mixture.

6. The latex foams of claim 4 wherein said dicarboxylic acid is from the group consisting of dicarboxylic acids having 19 and 21 carbon atoms and mixtures thereof.

7. A method of modifying latex foaming characteristics from the group of latexes consisting of copolymers of styrene-butadiene, polybutadiene, poly-isoprene, and neoprene which comprises, mixing at least 0.075 parts and not more than 10 parts per 100 parts latex of a dicarboxylic acid from the group consisting of carboxylic acids having from 15 to 26 carbon atoms, at least one carboxyl group near the middle of the hydrocarbon chain, and at least one carboxyl group on a terminal carbon and mixture thereof, into a compounded latex formulation, and frothing at a pH above 9.5.

8. Latex foams from the group of latexes consisting of copolymers of styrene-butadiene, polybutadiene, poly-isoprene, and neoprene having higher than normal densities containing between 0.075 parts and not more than 10 parts per 100 parts of polymer of a dicarboxylic acid from the group consisting of azelaic acid, dimer acids having 36 carbon atoms, and mixtures thereof.

9. Latex foams from the group of latexes consisting of copolymers of styrene-butadiene, polybutadiene, poly-isoprene, and neoprene containing at least 0.075 parts and not more than 10 parts per 100 parts of latex of a polycarboxylic acid having at least one carboxyl group near the middle of the hydrocarbon chain and at least one carboxyl group on a terminal carbon from the group consisting of $C_{22}$-tricarboxylic acid, $C_{26}$-pentacarboxylic acid, $C_{22}$-tricarboxylic fatty acid mixtures and mixtures thereof.

References Cited

UNITED STATES PATENTS

| | | | |
|---|---|---|---|
| 2,640,087 | 5/1953 | Borton | 260—2.5 L |
| 2,680,140 | 6/1954 | Carter | 260—2.5 L |

FOREIGN PATENTS

| | | | |
|---|---|---|---|
| 1,402,667 | 3/1965 | France | 260—537 |

OTHER REFERENCES

Roe et al.: *Branded Carboxylic Acids From Long-Chain Unsaturated Compounds.* J. of the American Oil Chemists Soc., December 1960, Vol. 37, No. 12, pp. 661–668.

WILBERT J. BRIGGS, Sr., Primary Examiner

U.S. Cl. X.R.

161—159; 260—2.5 H, 2.5 HB, 5, 23.7 A, 29.7 R, 45.85, 83.3, 85.1, 94.7 R

PO-1050
(5/69)

UNITED STATES PATENT OFFICE
CERTIFICATE OF CORRECTION

Patent No. 3,833,524           Dated September 3, 1974

Inventor(s) Benjamin F. Ward

It is certified that error appears in the above-identified patent and that said Letters Patent are hereby corrected as shown below:

Column 2, line 7, "ingreident" should read --ingredient--

Column 2, line 36, "synethic" should read --synthetic--

Column 2, line 47, "$C_{21}$-discarboxylic" should read --$C_{21}$-dicarboxylic--

Column 3, line 57, "dispraprtionated" should read --disproportionated--

Claim 1, line 4, "carboxylic" should read --carboxyl--

Signed and sealed this 3rd day of December 1974.

(SEAL)
Attest:

McCOY M. GIBSON JR.                C. MARSHALL DANN
Attesting Officer                  Commissioner of Patents